United States Patent [19]
Shirato et al.

[11] 4,345,262
[45] Aug. 17, 1982

[54] INK JET RECORDING METHOD

[75] Inventors: Yoshiaki Shirato, Yokohama;
Yasushi Takatori, Sagamihara;
Toshitami Hara, Tokyo; Yukuo
Nishimura, Sagamihara; Michiko
Takahashi, Tokyo, all of Japan

[73] Assignee: Canon Kabushiki Kaisha, Tokyo, Japan

[21] Appl. No.: 119,453

[22] Filed: Feb. 7, 1980

[30] Foreign Application Priority Data

Feb. 19, 1979 [JP] Japan .................................. 54/18796
Mar. 6, 1979 [JP] Japan .................................. 54/25929
Apr. 2, 1979 [JP] Japan .................................. 54/39531

[51] Int. Cl.³ ............................................ G01D 15/18
[52] U.S. Cl. .................................. 346/140 R; 346/1.1
[58] Field of Search ...................... 346/1, 75, 140 PD

[56] References Cited

U.S. PATENT DOCUMENTS 2,843,064 7/1958 Endo et al. ........................... 346/75
3,878,519 4/1975 Eaton ........................ 346/140 PD X
4,251,824 2/1981 Hara et al. ................... 346/140 PD

FOREIGN PATENT DOCUMENTS

2843064 4/1979 Fed. Rep. of Germany ........ 346/75

Primary Examiner—George H. Miller, Jr.
Attorney, Agent, or Firm—Fitzpatrick, Cella, Harper & Scinto

[57] ABSTRACT

An ink jet recording method which comprises contacting or bringing closer an electro-thermal transducer with or to a recording liquid in an operating chamber having a discharge orifice, introducing into the electro-thermal transducer an input pulse signal with its pulse width being in a range of from 0.1 μsec. to 500 μsec., said input pulse signal being introduced in such a manner that its input cycle becomes at least three times as large as said pulse width, discharging and sputtering said recording liquid from said discharge orifice in the form of fine droplet in accordance with operating force developed within said operating chamber, and effecting image recording on the surface of a recording medium with the liquid droplets.

15 Claims, 8 Drawing Figures

INK JET RECORDING METHOD

BACKGROUND OF THE INVENTION

1. Field of the Invention

This invention relates to a recording method generally called "ink jet recording method", and, more particularly, it is concerned with such recording method which performs recording by discharging and sputtering a recording liquid in the form of fine droplets by the action of heat, and causing the droplets to adhere to the surface of a recording medium.

Recently, a non-impact recording system has drawn attention to all concerned because noises which occur at the time of recording are extremely low to the extent that they are negligible in contrast to an impact recording system such as that represented by typewriters. Of various kinds of such non-impact recording system, an ink jet recording method capable of performing the recording operations at high speed and yet requiring no particular image fixing treatment to plain paper is recognized to be a very promising one. Various systems have so far been proposed for this ink jet recording method, of which various improvements have been made to some of them for commercialization, and efforts are still being made to some others for this practical application.

To make the matter short, the ink jet recording method is to perform the recording by ejecting and sputtering droplets of a recording liquid called "ink" through a fine orifice (or orifices), and causing it to adhere onto the surface of the recording member. This ink jet recording method is classified into several types depending on its method of generating droplets of the recording liquid, its method of controlling the sputtering direction of the droplets thus produced, and others.

2. Description of the Prior Art

Heretofore, the so-called "heat sensitive recording system" which utilizes heat generation from a thermal head has been widely adopted in various printers, facsimiles, and so on.

This recording system is such that the thermal head is contacted to a recording paper prepared by forming a layer of heat sensitive recording material on an arbitrary substrate such as paper, etc., and a thermal information input is introduced through this thermal head to obtain a color formed image on the recording paper. In more detail, a signal generated in a power source is first transmitted to the thermal head through an electrical circuit. In this case, a resistor in the thermal head produces heat, and an image in conformity to the signal is obtained in the recording layer.

The advantages in the above-mentioned heat-sensitive recording system are as follows: (1) a primary color forming recording material is used; (2) the device is of maintenance-free type; (3) the recording material is cheap in price, and its handling is also easy; (4) the device can be reduced in size; (5) noiseless recording operation can be carried out in view of its being of a non-impact type; (6) the recording system including the device per se can be obtained at a low cost. On the other hand, however, this heat sensitive recording system has the following disadvantages.

The total disadvantage which has so far been known with respect to the heat sensitive recording is that, among other things, its printing speed is very slow in comparison with other recording methods. For example, the heat pulse which is practically used is of an order of 10 m sec to 20 m sec. Even for particularly high printing speed, it is of an order of 5 m sec to 6 m sec at best. In addition, the result of printing by this heat sensitive recording method, i.e., quality of the resulted image, cannot be said to be satisfactory. In particular, this heat sensitive recording system is almost incapable of performing image recording with a high image resolution. Thus, with the conventional heat sensitive recording system, it has not yet been made possible to perform the image recording with high image quality and at a high recording speed, in the true sense of the words.

SUMMARY OF THE INVENTION

It is therefore a principal object of the present invention to provide an improved recording system, i.e., ink jet recording method, in which a conventional thermal head is used, and in which the total defects inherent in the heat sensitive recording system so far known have been completely removed to thereby enable the high speed recording to be effected with satisfactory energy efficiency.

It is another object of the present invention to provide an ink jet recording method using heat energy, by which the recording characteristic, particularly the quality of the recorded image, is remarkably improved.

It is still another object of the present invention to provide an improved recording method, in which response and stability of an output with respect to its input has been sufficiently increased.

According to the present invention, generally speaking, there is provided an ink jet recording method which comprises: contacting or bringing closer an electrothermal transducer with or to a recording liquid in an operating chamber having a discharge orifice; introducing to the electro-thermal transducer an input pulse signal with its pulse width being in a range of from 0.1 $\mu$sec. to 500 $\mu$sec., the input signal being introduced in such a manner that its input cycle may become at least three times as large as the pulse width; discharging and sputtering the recording liquid from the discharge orifice in droplet form in accordance with the operating force developed within the operating chamber; and performing image the recording on the surface of recording medium with the droplets.

DESCRIPTION OF THE PREFERRED EMBODIMENTS

The present invention is capable of carrying out good image recording under a high speed condition by introducing with a predetermined cycle a short pulse signal, which has never been used so far, as an input into an electro-thermal transducer, i.e., a thermal head, which is an input source for the recording informations with respect to the recording liquid.

In the following, the present invention will be described with particularity in reference to the accompanying drawings.

Figure 1:
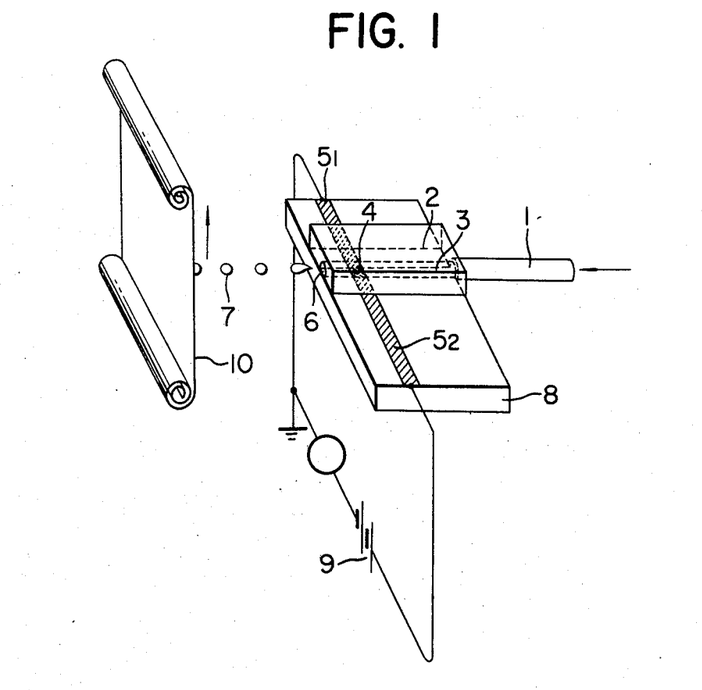
FIGS. 1 and 2 are respectively schematic views showing a preferred embodiment of the ink jet recording device which is operable by the method according to the present invention.

FIG. 1 illustrates an outline principle of the image recording by the ink jet recording method according to the present invention, in which a recording liquid 3 (generally called "ink") introduced into a liquid chamber 2 through a conduit pipe 1 is instantaneously subjected to a change in its physical state in accordance with heat generation by electric conduction through an electrothermal transducer 4 provided in the liquid chamber 2.

Incidentally, the electro-thermal transducer 4 generates a heat pulse signal by electric conduction through electrodes $5_1$ and $5_2$ connected to the transducer. In this manner, there is imparted an operating force to the recording liquid 3 by the change in the physical state of the recording liquid 3, as the result of which the liquid 3 is discharged and sputtered from an orifice 6 in the form of droplet 7, and the image recording is carried out by adhesion of the droplets onto a recording member 10. The transducer 4 is provided on a substrate 8. When a voltage from a power source 9 is applied to the transducer in accordance with recording informations, an electric signal input is introduced into the transducer 4 with the result that it generates heat and the image recording corresponding to the input signal is done by droplets 7 sputtered and adhered onto the image recording member 10.

According to the method of the present invention, the electrical signal input to the transducer 4 may be introduced either every time it becomes necessary to discharge the droplets in accordance with the recording informations, or discontinuously at a predetermined cycle in a pulse form irrespective of the recording informations. In the case of the latter electrical signal input system, it becomes necessary to further control the discharged droplets 7 in accordance with the recording informations irrespective of the nature of such informations. Accordingly, in the latter system, a droplet control device is required in addition to the droplet jet device, hence the implementing apparatus as a whole would become disadvantageously complicated.

The size (diameter) of the droplet discharged and sputtered from the orifice 6 is determined by various controlling factors such as an electrical energy quantity to be introduced into the electro-thermal transducer 4 as an input information, a transmission efficiency of the heat energy as converted from the electrical energy into the recording liquid 3, a conversion efficiency of the electro-thermal transducer, a diameter of the orifice 6, an inner diameter of the liquid chamber 2, a distance from the position of the orifice 6 to the transducer 4, an operating force to be imparted to the recording liquid 3, a quantity of the liquid 3 subjected to the operating force, and specific heat, heat conductivity, boiling point, latent heat for evaporation, etc. of the recording liquid 3.

Accordingly, by changing any one or two or more of these factors, it is possible to readily control the size of the droplet, whereby the desired image recording can be done on the recording member 10 with an arbitrary droplet diameter and spot diameter.

In connection with the above, a heat sensitive printing head (i.e., a thermal head) so far used widely in the field of the heat sensitive recording is adopted as the electro-thermal transducer 4 in the illustrated embodiment. The thermal head is classified into a thick film head, a thin film head, and a semi-conductor head, depending on its fabrication method, and kind of the heat generating resistor, etc. used therein. In the present invention, all these kinds are usable, although use of the thin film head is desirable at present stage, if the image recording of high speed and high image resolution is particularly intended.

The recording liquid to be used for the method of the present invention is prepared by dissolving or dispersing a wetting agent such as ethylene glycol, a surfactant, various kinds of dyestuff, and so forth in a principal solvent such as, for example, water, ethanol, toluene, and others. In the preparation of the liquid, it is efficacious to filter the liquid as prepared, or to provide a filter in the liquid chamber, or to take some other measures for preventing the orifice 6 from clogging, as is the case with the existing ink jet recording method.

Figure 2:
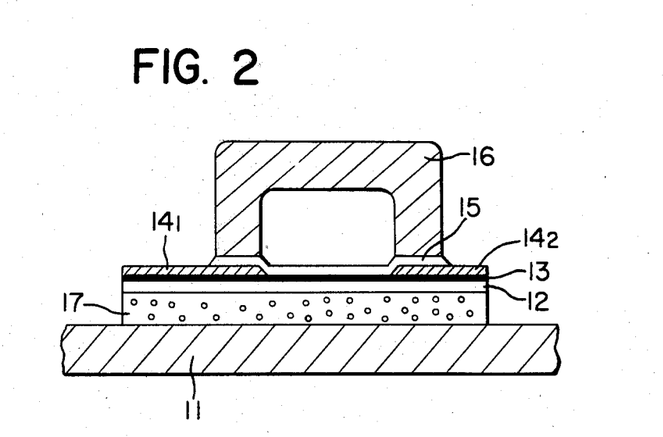

Details of the liquid chamber 2 will now be explained hereinbelow in reference to FIG. 2. The liquid chamber is constructed in the following manner. That is, an $SiO_2$ film 12 is spattered to a thickness of 3 $\mu m$ onto a silicon substrate 17 of approximately 1 mm thick, then $ZrB_2$ as a resisting body 13 is spattered thereon to a thickness of 1000 Å, and thereafter Ti and Al are laminated by the evaporative deposition to this respective thicknesses of 50 Å and 5,000 Å. These laminated films are subjected to selective etching to form aluminum electrodes $14_1$ and $14_2$ for electric conduction. The size of the exposed resistive body 13 is 50 $\mu m \times 300$ $\mu m$, and its resistance is 200 ohms. Next, an $SiO_2$ film 15 is spattered to a thickness of 1 $\mu m$ on this resistive body 13, on which a glass cover 16 having a groove of 50 $\mu m$ wide and 40 $\mu m$ deep formed therein is bonded. After this, the silicon substrate 17 is bonded to a heat sink plate 11 made of aluminum. When the recording liquid, i.e., ink, of the undermentioned composition, for example, is fed to the liquid chamber of the abovementioned construction, and a voltage in rectangular waveform having a pulse width of from approximately 0.1 $\mu sec.$ to 500 $\mu sec.$ is applied discontinuously with its input cycle at least three times as large as the pulse width, there occurs stable discharge of droplets of the recording liquid in accordance with the pulse input. Incidentally, the pulse width as used herein stands for the voltage application time.

| Composition of Ink | |
|---|---|
| Ethyl alcohol | 100 parts by wt. |
| Black dye | 2 parts by wt. |

The results of the experiments are as shown in Table 1 below.

TABLE 1

| PULSE WIDTH | PULSE VOLTAGE VALUE | PULSE INPUT CYCLE | ENERGY REQUIRED FOR ONE DROPLET |
|---|---|---|---|
| 500 $\mu$ sec. | 18 volts | 1.5 m sec.–10 m sec. | $8.0 \times 10^3$ erg |
| 100 $\mu$ sec. | 21 volts | 300 $\mu$ sec.–10 m sec. | $2.2 \times 10^3$ erg |
| 50 $\mu$ sec. | 26 volts | 150 $\mu$ sec.–5 m sec. | $1.7 \times 10^3$ erg |
| 30 $\mu$ sec. | 29 volts | 100 $\mu$ sec.–2 m sec. | $1.2 \times 10^3$ erg |
| 20 $\mu$ sec. | 31 volts | 80 $\mu$ sec.–2 m sec. | $9.6 \times 10^2$ erg |
| 10 $\mu$ sec. | 37 volts | 60 $\mu$ sec.–1 m sec. | $6.8 \times 10^2$ erg |
| 3 $\mu$ sec. | 47 volts | 20 $\mu$ sec.–1 m sec. | $3.3 \times 10^2$ erg |
| 1 $\mu$ sec. | 59 volts | 15 $\mu$ sec.–1 m sec. | $1.8 \times 10^2$ erg |
| 0.3 $\mu$ sec. | 94 volts | 15 $\mu$ sec.–1 m sec. | $1.3 \times 10^2$ erg |

TABLE 1-continued

| PULSE WIDTH | PULSE VOLTAGE VALUE | PULSE INPUT CYCLE | ENERGY REQUIRED FOR ONE DROPLET |
|---|---|---|---|
| 0.1 μ sec. | 150 volts | 15 μ sec.–1 m sec. | $1.1 \times 10^2$ erg |

The pulse width of the rectangular waveform voltage to be applied should desirably be as short as 500 μsec. or so as shown in the above table. It is also desirable that the input cycle of each pulse be as short as possible within a range three times as large as the pulse width. The reason for this is that the shorter the values of the pulse and the input cycle become, the higher becomes the response to the signal input of the discharge of the recording liquid droplets, which is very advantagious from the stand point of high speed recording operation. Further, when the input pulse width becomes short, energy quantity required for discharging a single droplet of the recording liquid may be small. This means that the shorter the pulse width is, the better, even within a range of 500 μsec. or below. However, it becomes necessary that, as the pulse width is shorter, the voltage value per pulse be increased so as to bring the electro-thermal transducer to a high temperature in a short period of time. In this instance, however, it is not preferable to increase the voltage value of the pulse indiscreetly. Therefore, from the practical standpoint, a short pulse of 0.1 μsec. may be the limit at present.

According to the results of the experiments and studies done by the present inventors, when the pulse width used exceeds 500 μsec., the energy quantity required for discharging one droplet increases and response of the droplet discharge lowers. In view of this finding, it may be said that practical advantage of adopting the pulse width above the value hardly exists.

As seen from the above Table 1, the pulse width of 0.1 μsec. to 500 μsec. can be said to be a recordable range for the purpose of the present invention. Considering, however, the high speed in the recording operation, the energy saving at the high speed operation, and the durability of the electro-thermal transducer, the recording operation by the electrical signal pulse having a pulse width of 0.3 μsec. to 100 μsec., or more preferably 1 μsec. to 30 μsec., can be said to be more effective. In case the pulse to be used has a short pulse width of 0.1 μsec. to 20 μsec. or so, it is desirable that the lower limit of the pulse input cycle be set approximately four to 150 times as large as the pulse width.

For the sake of reference, the following comparative tests have been done, in which the thermal head is used to carry out the thermal printing on heat-sensitive paper. The thermal head used is of the same construction as that used in the practice of the method according to the present invention. The heat-sensitive paper used is a product of Jujo Paper Manufacturing Co., Ltd., Japan, sold under a trade name of "TP50-KH". The conditions for and results from the comparative experiments are as shown in the following Table 2.

TABLE 2

| PULSE WIDTH | PULSE VOLTAGE VALUE | PULSE INPUT CYCLE | ENERGY REQUIRED PER ONE IMAGE ELEMENT |
|---|---|---|---|
| 10 m sec. | 29 volts | 15 m sec.–30 m sec. | $4.2 \times 10^3$ erg |
| 3 m sec. | 35 volts | 6 m sec.–10 m sec. | $1.8 \times 10^3$ erg |
| 1 m sec. | 44 volts | 2.5 m sec.–5 m sec. | $9.7 \times 10^4$ erg |
| 500 μ sec. | 50 volts | 1.5 m sec.–4 m sec. | $6.2 \times 10^4$ erg |
| 100 μ sec. | *Not usable due to the thermal head being beyond its durability. | | |

Comparing the experimental results in the above Table 2 with these in Table 1, it will be understood that the method of the present invention is extremely advantageous in the high speed recording. By the way, in the ink jet recording method as in the present invention, wherein the recording operation is to be done in accordance with generation of heat energy, the thermal changes in the electro-thermal transducer and the state changes in the recording liquid follow an input electrical pulse signal when it is introduced, as shown in FIG. 3.

Figure 3:
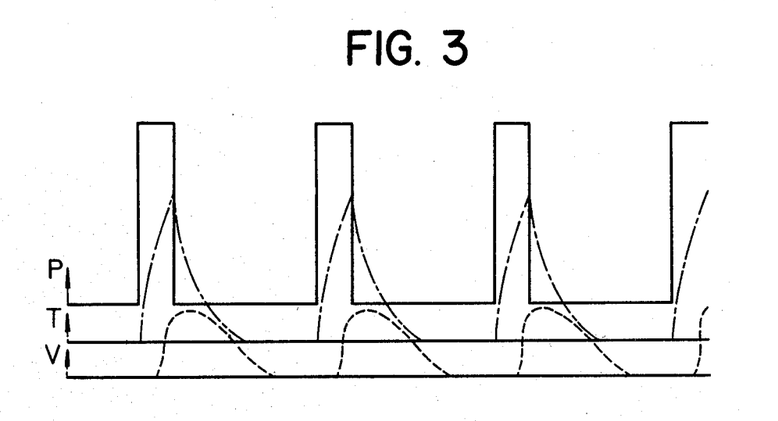
FIGS. 3 and 4 are respectively schematic diagrams, drawn in a model form, of a shape of an input signal to an electrothermal transducer and of horological changes in an output incidental to the input.

In FIG. 3, a solid line denotes an electrical pulse signal P, a dot-and dash line represents the thermal changes T following the input pulse signal, and a dash line indicates the sate changes V in the recording liquid. All these changes and the input pulse signal are represented in terms of their horological changes. As shown in FIG. 3, there is required a time period three times as long as the pulse width from the introduction of the electrical pulse input to the completion of the changes following the input pulse signal. In case the input cycle of the electrical pulse becomes shorter than three times one pulse width, as shown by a model in FIG. 4, overlapping occurs among the thermal changes in the transducer and the state changes in the recording liquid with respect to the input electrical pulse signal. As the consequence of this, there will be observed various inconveniences such that discharge of the recording liquid droplets does not accurately respond to the signal input, the droplet discharge fluctuates, and others.

Figure 4:
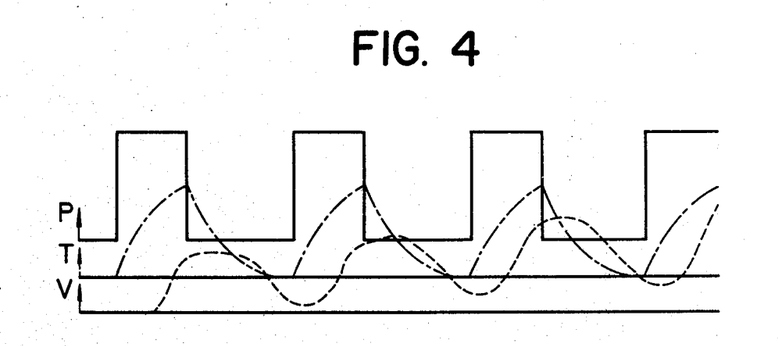

Accordingly, it is desirable in the present invention that the input cycle of the pulse signal having one pulse width of from 0.1 μsec. to 500 μsec. be selected in the ranges as shown in Table 1 above for not lowering the response frequency of the output so much. In FIG. 4, too, as is the case with FIG. 3, the solid line denotes the pulse signal P, the dot-and-dash line represents the thermal changes T in the electro-thermal transducer following the pulse signal input, and the dash line indicates the state changes V in the recording liquid.

Figure 5:
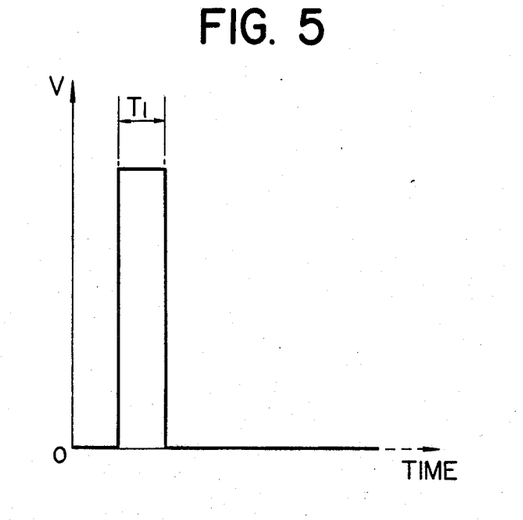
FIGS. 5 and 6 are respectively schematic diagrams of waveforms of the pulse signals according to the present invention.
Figure 6:
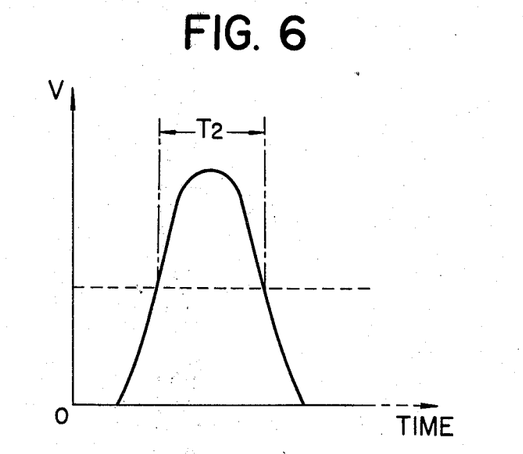

The waveform of a voltage used for the signal input in the present invention is not limited to the rectangular waveform as shown in FIG. 5. When there is applied a pulse voltage of a shape other than the rectangular waveform, such as one shown in FIG. 6, its pulse width is taken with a half value width (in the illustration, this is denoted by $T_2$) of the peak energy. In the rectangular pulse in FIG. 5, the pulse width is denoted by $T_1$. The preferred value of a ratio of the input cycle to the pulse width is substantially the same as in the case of using the silicon substrate, even when the substrate 17 in the afore-described embodiment is made of an aluminum plate, an alumina plate, or the like, instead of silicon.

The effects to be resulted from the ink jet recording method according to the present invention as detailed in the foregoing are enumerated as follows.

(1) Good response of the output (discharge of the recording droplets) to the pulse signal input, and stable state of the output: This enables the high speed recording to be effected with good image quality, which could not be realized in the conventional recording system utilizing the heat action.

(2) Good energy efficiency in the period from the signal input to its output (recording): this enables the so-called "energy-saving recording system" to be realized.

(3) The so-called "on-demand" ink jet recording system can be readily realized.

(4) In comparison with the conventional ink jet recording system, the implementing device can be made very simple in construction and small in size.

(5) Since the drive pulse width for the implementing device is short, there is an increase in the degree of freedom in the electrode matrix wiring, which enables the number of lead wires to be less than that in the conventional device, when it is constructed in a multi-array type.

Even in the ink jet recording method utilizing heat energy and having many excellent advantages as mentioned in the preceding, there are still many points to be solved in respect of securement of stability in the recording characteristic, securement of high quality recorded image, and, further, maintenance of stability of these characteristics at the high speed recording operations. In particular, when the "drop-on-demand" system is adopted, there exist various problems such as stable and uniform supply of the recording liquid, efficient discharge of the liquid droplets, constantly stable formation of the liquid droplets in uniform shape and diameter, droplet forming frequency (corresponding to the number of droplets to be discharged per unit time), and so forth. The reason for this is that, unlike the so-called "continuous" recording method which forms droplets of uniform diameter by first ejecting a recording liquid from a discharge orifice under pressure to form a liquid column, and then imparting a regular pulsating current to the liquid column, the "drop-on-demand" recording system discharge droplets through the discharge orifice based on an input recording signal every time it is introduced, and, moreover, replenishment of the liquid which has fallen short of is done by utilizing capillary action.

For instance, the droplet discharge efficiency is largely governed by positional relationship among the orifice side end part having the discharge orifice formed at the tip end thereof, the energy acting part, the inlet side end part which communicates with the energy acting part and has an inlet port to feed the liquid into the energy acting part, as well as relationship among the energy quantity to be generated at the energy acting part, the size of the discharge orifice, and so forth, although the discharge efficienty cannot be improved unless energy generated in accordance with the recording signal input into the energy acting part, i.e., the electro-thermal transducer, communicating with the discharge orifice effectively acts on the liquid in this energy acting part, based on which action of energy the droplets are discharged with the minimum energy loss from the discharge orifice faithfully responding to the abovementioned recording signal.

When the discharge orifice is small in size, the cross-sectional area of the orifice side end part is substantially equal to the size of the discharge orifice, and a length from the discharge orifice to the energy acting part is sufficiently longer than $\sqrt{S/\pi}$ (where S is an area of the discharge orifice), the shape of the droplets to be discharged from the discharge orifice varies from a sphere to an elongated ellipsoid, or, in some case, it indicates a shape like a comet leaving its trail. In the case of a high density, multiorifice recording head, such phenomenon tends to occur, because the recording head has its flow paths, each of which is rectilinear and is substantially constant in its cross-sectional area up to the discharge orifice including the energy acting part as its eventual shape.

Accordingly, in the case of the drop-on-demand recording system, possibility of the satellite droplets to occur is higher than in the abovementioned continuous recording method, which prevents improvement in the quality of the recorded image, although this may also depend on the physical parameters of the recording liquid to be used.

Particularly, in the ink jet recording method according to the present invention, the abovementioned various problems tend to occur, since the droplet discharge is effected on the basis of changes in the thermal state of the recording liquid, hence these problems should be solved.

According to the findings obtained by the present inventors through their various researches and studies, it has been found out that, in the above-described ink jet recording method according to the present invention, the recording characteristics, particularly, the recording image quality, can be remarkably improved by effecting the recording operations with a space interval between the discharge orifice and the surface of the recording medium being maintained at a value of $\sqrt{S}$ (S denotes an area of the discharge orifice) or above, but not exceeding a value which causes the recording liquid droplet as discharged to be broken off during its sputtering.

In the following, such improved technique will be explained in detail in reference to FIGS. 7A and 7B.

Figure 7A:
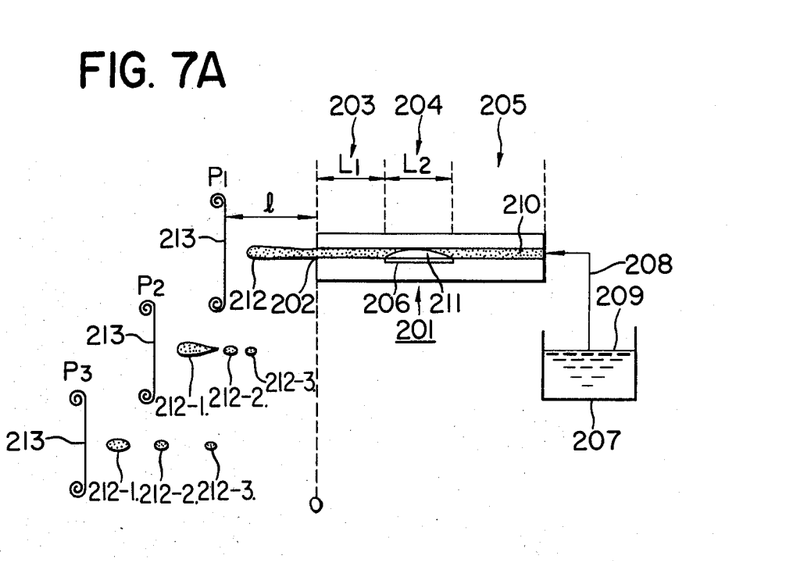
FIGS. 7A and 7B are respectively explanatory diagrams of one embodiment of the present invention.

In FIG. 7A, a numeral 201 refers to a recording head, 203 designates an orifice side end part having at its extreme end an orifice 202 for discharging liquid droplets, 204 denotes an energy acting part having an electro-thermal transducer 206 to generate heat as the energy for discharging the liquid droplets in accordance with a recording signal input, and 205 designates an inlet side end part having at its terminal end an inlet part 210 for feeding liquid 209 which is supplied from a liquid reservoir 207 through a conduit 208.

A reference numeral 211 designates a foam which has been created by abrupt state change in the recording liquid in the energy acting part 204, which change has occurred by the action of heat generated from electric conduction through the electro-thermal transducer 206.

Now, when the electric conduction is effected through the transducer 206, and abrupt state change occurs in the liquid in the energy acting part 204 to discharge the liquid droplets from the orifice 202, the discharged liquid droplet 212 in the vicinity of the orifice 202 is in a columnar shape having a cross-sectional area corresponding to an area S of the orifice 202 and a length substantially equal to a length $L_1$ between the orifice 202 and the transducer 206 (a length of the orifice side end part) or a length $L_2$ of the transducer 206 in the direction of its flow paths. Accordingly, when the sputtering distance is long, there inevitably occurs satellite droplets, while, when a recording paper 213 is placed at a position in the vicinity of $P_3$, the image recording like $P_3$ in FIG. 7B is resulted. As illustrated, the liquid droplets 212 discharged from the discharge orifice 202 are in an elongated ellipsoid shape, on account of which, when the liquid droplet is separated by the surface tension during its sputtering, and broken off into three portions as illustrated, there are formed a single principal liquid droplet 212-1 having a relatively large volume, and two satellite liquid droplets 212-2, 212-3, both having relatively small volume. The moving speed of each of the liquid droplets 212-1, 212-2 and 212-3 thus produced is not uniform. In one case, they may be at an equal speed, and, in another case, they may be at mutually different speed.

Figure 7B:
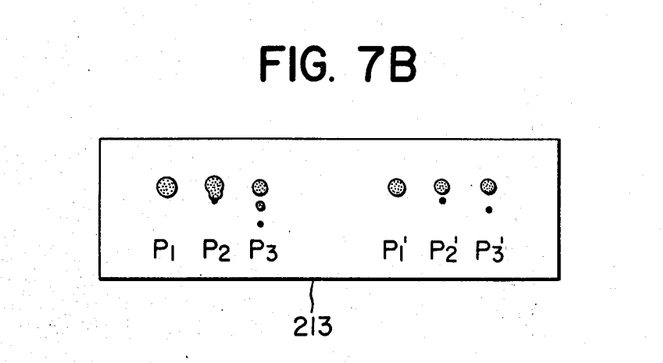

Accordingly, when the position of the recording paper 213 is varied as, for example, $P_1$, $P_2$ and $P_3$, in FIG. 7A, the liquid droplets adhere onto the recording paper 213 in the state of $P_1$, $P_2$ and $P_3$ as shown in FIG. 7B. Such state of the liquid droplets changes depending on the relationship between the sputtering speed of the liquid droplets 212 and the moving speed of the recording paper 213. This change in the state is particularly remarkable in the case of the high speed recording, wherein the recording paper 213 is caused to move at a higher speed than the sputtering speed of the liquid droplet 212.

Accordingly, it is preferable that the position of the recording paper 213 be separated from the discharge orifice at a distance, within which the liquid droplet to be generated is not broken off during its sputtering to produce the satellite droplets.

However, when the distance is too long, or, on the contrary, too short, stability in the recording characteristics of the image, etc. are greatly affected. Also, as a practical matter, whether the satellite droplets are produced or not appears to be based on complicated relationships among various factors relevant to the droplet formation, hence determination of an appropriate distance depends in most cases on trial and error.

As the result of strenuous efforts in the researches and studies done by the present inventors, therefore, it has been found out that, if the positioning of the recording paper is done by taking into consideration the area of the discharge orifice and the length of the orifice side end part (in particular, the area of the discharge orifice), a stable recording characteristic can be obtained almost constantly, even when the other factors vary.

In the present invention, the recording operation is performed by disposing the recording paper as the image recording member spaced from the discharge orifice by a distance of $\sqrt{S}$ or more (S denotes an area of the discharge orifice), or, more preferably, $2\sqrt{S}$ or more. The upper limit of the distance is within a range not to cause formation of the satellite droplets. More particularly, when the length of the orifice side end part is $L_1$, the distance is set at $50L_1$, or more preferably $40L_1$, or optimally $30L_1$.

In the present invention, the position of the recording paper from the discharge orifice is set within the abovementioned numerical range. This is based on the experimental findings that recorded images of extremely high quality, high clearness and high image resolution can be obtained when the positions of the discharge orifice and the recording paper are maintained based on the abovementioned relationship resulted from various experiments repeated on each of several hundreds of different recording heads manufactured. For instance, when the recording paper is positioned at a distance shorter than $\sqrt{S}$ from the discharge orifice, there would occur disturbance in the droplet flight with movement of the recording paper, disturbance in the droplets generation, and so forth. Practically speaking, positioning of the recording paper at such close position, and constant maintenance of the position throughout the recording operation accompany high difficulty. On the contrary, when the recording paper is disposed at a distance longer than $50L_1$, disturbance in the image quality takes place. In particular, when the recording paper is moved at high speed, there occurs the so-called "rain-drop" phenomenon, in which the adhered liquid droplet leaves its trail.

Further, the lengths $L_1$ and $L_2$ are also important for more effectively attaining the present invention. That is, when the length $L_1$ is too long, the droplet discharge efficiency lowers extremely, and if it is too short, the splashing phenomenon tends to occur frequently at the time of the liquid discharge. It goes without saying that a preferred value of the length $L_1$ is largely governed by those factors dependent on the area S of the orifice. More particularly, when the device is designed to satisfy a relationship of $S/\pi \leq L_1 \leq 50S/\pi$, more preferable result would come out for the present invention. For example, practical advantage can be obtained when the length $L_1$ is set in a range of from $5\mu$ to 5 mm.

In the following, a preferred embodiment of the ink jet recording method according to the present invention will be described.

EXAMPLE $SiO_2$ was sputtered onto an alumina substrate of 5 mm × 10 mm in size to a thickness of 3 μm, after which $HfB_2$ and Al where laminated on this coated substrate to a thickness of 1,000 Å and 5,000 Å respectively by using a mask of a predetermined pattern to thereby form a heat generating body (electro-thermal transducer). As the result, a pattern as shown in FIG. 1 was obtained. The size of the heat generating resistor is 40 μm × 500 μm (i.e., $L_2$ = 500 μm). Then, as shown in FIG. 2, a grooved cover plate having a groove of 40 μm × 400 μm × 5 mm in dimension formed therein was bonded to the heat generating body in such a manner that the groove in the cover plate may coincide with the heat generating body. In this case, the distance ($L_1$) from the orifice to the heat generating body was set at 500 μm. When a square wave of 40 volts with a pulse width of 10 μsec. was repeatedly applied to this heat generating body with a cycle of 500 μsec., a thin, long liquid column was discharged as shown in FIG. 7A. Resistance of the heat generating body was 150 ohms, and the ink used was prepared by dispersing a black dye in a solvent consisting principally of water.

When the recording operation was effected by keeping the recording paper away from the position of the discharge orifice by respective distances of 1.5 mm, 2.5 mm and 3.0 mm with the flying speed of the liquid droplet being approximately 5 m/sec., and the moving speed of the recording paper being 0.1 m/sec., there were observed the states of droplet adhesion on the recording paper as indicated by $P_1$, $P_2$ and $P_3$ in FIG. 7B. In this case, when the paper forwarding speed was reduced to a half, the state of $P_2$ was improved to $P_1$.

For comparison, a specimen was prepared by the same manufacturing steps to obtain the heat generating body of 40 μm × 100 μm in size (i.e., $L_2$ = 100 μm), and $L_1$ = 100 μm, the remaining parameters being the same as those of the abovementioned specimen. A square wave of 10 μsec. was repeatedly applied to this heat generating body with an input cycle of 500 μsec. The voltage applied in this case was 45 volts, and the resistance of the heat generating body was 750 ohms. The recording paper was forwarded at a rate of 1 m/sec. with a space interval between the paper and the orifice having been set at 0.6 mm, 5 mm and 6 mm, respectively. The results of the droplet adhesion on the recording paper are shown by $P_1'$, $P_2'$ and $P_3'$ in FIG. 7B. In this case, by reducing the paper forwarding speed, it was found possible that the recording could be done in the state of $P_1'$, even if the space interval between the paper and the orifice is set at 5 mm or so. Incidentally, the droplet discharging speed in this case was 2 m/sec.

What we claim is:

1. An ink jet recording method which comprises:
   (a) contacting or bringing closer an electro-thermal transducer with or to a recording liquid in an operating chamber having a discharge orifice;
   (b) introducing into the electro-thermal transducer an input pulse signal with its pulse width being in a range of from 0.1 μsec. to 500 μsec., said input pulse signal being introduced in such a manner that its input cycle becomes at least three times as large as said pulse width;
   (c) discharging said recording liquid from said discharge orifice in the form of a fine droplet in accordance with the operating force developed by the input of said pulse signal within said operating chamber; and
   (d) effecting image recording on the surface of a recording medium with the liquid droplets.

2. The ink jet recording method as set forth in claim 1, wherein the input pulse signal is introduced in accordance with recording informations.

3. The ink jet recording method as set forth in claim 1, wherein the input pulse signal is in the form of square wave.

4. The ink jet recording method as set forth in claim 1, wherein said electro-thermal transducer has a heat generating resistor.

5. The ink jet recording method as set forth in claim 1, wherein the recording is effected with a space interval between the discharge orifice and the surface of the recording medium being maintained at a value of $\sqrt{S}$ (where S in an area of the discharge orifice) or above, but not exceeding a value which causes the recording liquid droplet as discharged to be broken off during its flight.

6. An ink jet recording method which comprises:
   (a) contacting or bringing closer an electro-thermal transducer with or to a recording liquid in an operating chamber having a discharge orifice;
   (b) introducing into the electro-thermal transducer an input pulse signal with its pulse width being in a range from 0.3 μsec. to 100 μsec., said input pulse signal being introduced in such a manner that its input cycle becomes at least three times as large as said pulse width;
   (c) discharging said recording liquid from said discharge orifice in the form of a fine droplet in accordance with the operating force developed by the input of said pulse signal within said operating chamber; and
   (d) effecting image recording on the surface of a recording medium with the liquid droplets.

7. The ink jet recording method as set forth in claim 6, wherein the input pulse signal is introduced in accordance with recording informations.

8. The ink jet recording method as set forth in claim 6, wherein the input pulse signal is in the form of square wave.

9. The ink jet recording method as set forth in claim 6, wherein said electro-thermal transducer has a heat generating resistor.

10. The ink jet recording method as set forth in claim 6, wherein the recording is effected with a space interval between the orifice and the surface of the recording medium being maintained at a value of $\sqrt{S}$ (where S is an area of the discharge orifice) or above, but not exceeding a value which causes the recording liquid droplet as discharged to be broken off during its flight.

11. An ink jet recording method which comprises:
   (a) contacting or bringing closer an electro-thermal transducer with or to a recording liquid in an operating chamber having a discharge orifice;
   (b) introducing into the electro-thermal transducer an input pulse signal with its pulse width being in a range of from 1 μsec. to 30 μsec., said input pulse signal being introduced in such a manner that its input cycle becomes at least three times as large as said pulse width;
   (c) discharging said recording liquid from said discharge orifice in the form of a fine droplet in accordance with the operating force developed by the input of said pulse signal within said operating chamber; and
   (d) effecting image recording on the surface of a recording medium with the liquid droplets.

12. The ink jet recording method as set forth in claim 11, wherein the input pulse signal is introduced in accordance with recording informations.

13. The ink jet recording method as set forth in claim 11, wherein the input pulse signal is in the form of square wave.

14. The ink jet recording method as set forth in claim 11, wherein said electro-thermal transducer has a heat generating resistor.

15. The ink jet recording method as set forth in claim 11, wherein the recording is effected with a space interval between the orifice and the surface of the recording medium being maintained at a value of $\sqrt{S}$ (where S is an area of the discharge orifice) or above, but not exceeding a value which causes the recording liquid droplet as discharged to be broken off during its flight.

* * * * *

UNITED STATES PATENT AND TRADEMARK OFFICE
CERTIFICATE OF CORRECTION

PATENT NO. : 4,345,262
DATED : August 17, 1982
INVENTOR(S) : YOSHIAKI SHIRATO, ET AL.

It is certified that error appears in the above-identified patent and that said Letters Patent is hereby corrected as shown below:

On the Title Page, "Michiko Takahashi" should read --Michiko Tanaka--.

Column 5, lines 67 and 68, Table 2, "$10^3$" should read --$10^5$--.

Column 6, line 26, "sate" should read --state--.

Column 10, lines 40 and 41, "400 µm" should read --40 µm--;
line 47, "repeatedlyapplied" should read --repeatedly applied--.

Signed and Sealed this

Seventeenth Day of July 1984

[SEAL]

Attest:

GERALD J. MOSSINGHOFF

*Attesting Officer*     *Commissioner of Patents and Trademarks*